May 4, 1937.  D. SAMIRAN  2,078,977
FLUID DENSITY RESPONSIVE DEVICE
Filed April 29, 1930
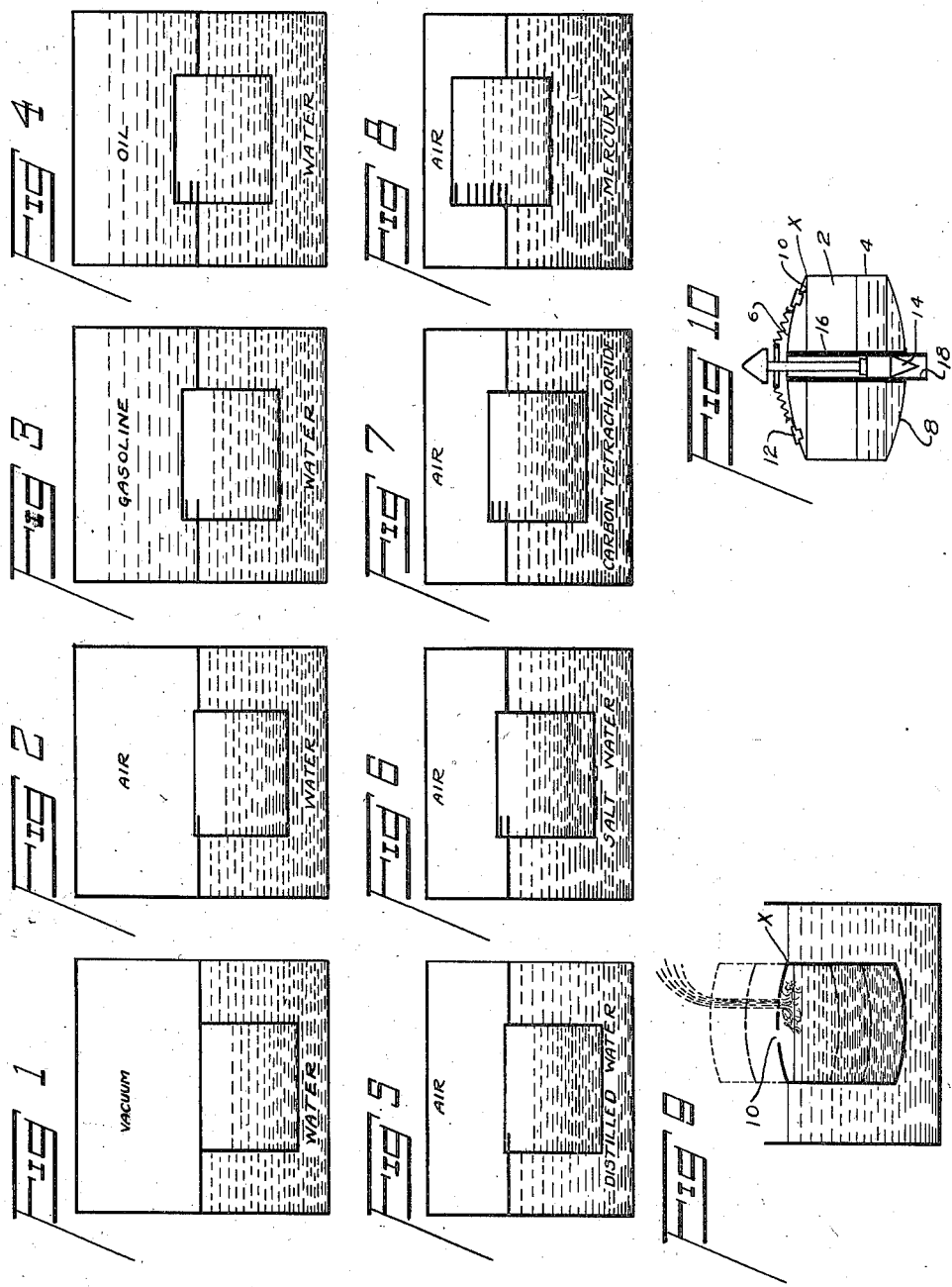
INVENTOR
DAVID SAMIRAN
BY Robert H. Green
ATTORNEY Patented May 4, 1937

2,078,977

UNITED STATES PATENT OFFICE 2,078,977

FLUID DENSITY RESPONSIVE DEVICE

David Samiran, Dayton, Ohio

Application April 29, 1930, Serial No. 448,391

2 Claims. (Cl. 210—54)

(Granted under the act of March 3, 1883, as amended April 30, 1928; 370 O. G. 757)

The invention described herein may be manufactured and used by or for the Government for governmental purposes, without the payment to me of any royalty thereon.

My invention relates to fluid density responsive devices and more particularly to float means responsive to fluids having densities greater or less than a fluid of known density and is especially useful in connection with automatic valves controlled by the density of the fluid passing through it.

This invention has for an object to provide an improved method of and means for adjusting a float device to a predetermined weight.

My invention has for another object to provide a new and improved float device that when adjusted to a predetermined weight for a reference medium, its upper surface will assume a position between the upper surface level of a reference medium and the upper surface level of any medium having a density less than the density of the reference medium, which position will vary in proportion to the difference in their densities.

Another object of my invention is to provide in an adjustable float device of this character, means for determining approximately the depth to which the float must be immersed in the reference medium to be adjusted thereto.

A further object of my invention is to provide in connection with a float device of this character, means for indicating when said float device is adjusted to have a weight slightly less than the weight of the reference medium displaced by its entire volume but greater than the weight of a similar volume of any other medium of less density.

Still another object of my invention is to provide in connection with a device of this character, a novel means adapted for adjusting said device to any one of a number of predetermined weights to which said device is capable of adjustment.

And still another object of my invention is to provide an improved method of constructing a float device of this character.

Referring to the drawing:

Figs. 1 to 4 are diagrammatic views illustrating the progressive changes in the depth to which a body adjusted to the reference medium, water, sinks with the progressive changes in the density of the upper medium.

Figs. 5 to 8 are views similar to Figs. 1 to 4, the reference medium to which the body is adjusted being water and air; substituted for the water in each of the consecutive figures are fluids having a density greater than water.

Figs. 1 to 8 further illustrate the manner of obtaining the graduations on the body whereby the body may be used as an instrument to indicate the densities of gases and fluids lighter or heavier than water.

Fig. 9 is a diagrammatic view illustrating the manner of adjusting a modified float device so as to be capable of doing work in the reference medium to which it is adjusted.

Fig. 10 is a diagrammatic view of the float device adjusted as shown in Fig. 9 and applied to a fluid segregator valve.

Since it is well known that buoyant force depends on the weight of medium displaced, the volume of medium displaced by a body will be greater or less depending upon the density of the medium in which it floats, and the depth to which the body is immersed varies inversely according to the density of the medium.

Assuming now that a body is placed in a reference medium such that it floats with its upper surface in substantial coincidence with the level of said medium, any change in the density of a medium above the reference medium or in the reference medium per se, will increase or decrease the resultant upward force exerted on the body corresponding to the change in the weight of the medium or media displaced by the entire volume of said body.

This principle makes it possible to adjust a float device to any desired reference medium so that the resultant buoyant force due to a change in density of said medium or in the density of a medium or media with which the reference medium is associated, will cause a change in the immersion of the body in proportion to the difference in the densities of the reference medium or in the difference in the densities of the reference medium and the other medium or media.

If there is a vacuum above the reference medium, as diagrammatically shown in Fig. 1 of the drawing, there is no additional upward buoyant force exerted since the upper portion of the body causes no further displacement of matter. Assuming now that the medium above the reference medium is a gaseous substance, such as air, illustrated in Fig. 2, then the body will rise from the position shown in Fig. 1 an amount proportional to the change in the densities of the upper medium. If, then, gasoline or oil is substituted for air the body will rise further upward as shown in Figs. 3 and 4 respectively. It will, therefore, be apparent that as long as the density of the upper medium is less than the density of the lower medium, the body will assume a position so that its upper surface is between the upper surface levels of the medium thereabove. When its density is the same as that of the reference medium, the upper surface of the body will be slightly above the level of the medium. Fluid of greater density than the reference medium when substituted for the air, gas or oil, will of course displace the reference medium and body without affecting the relative position of said body and reference medium.

Under the conditions above described in connection with the illustrations in Figs. 1 to 4, a body is said to be "adjusted" to a reference medium which, in this instance, is water. This adjustment may be obtained in a float device for any desired reference medium which may be gaseous substance or a liquid, or a combination thereof.

As illustrated in Figs. 5 to 8, air and water are taken as the reference medium and various liquids of a greater density than water are substituted for water. As heretofore described, the float will be caused to rise in proportion to the difference in the densities between any one of the substituted media and the reference medium. It will be readily obvious that by graduating the float device with reference to the depth to which the float device sinks in the different fluids in accordance with this method, an instrument may be obtained for indicating the density of both gases and/or liquids.

It will also be apparent that numerous methods of determining the position the body must assume in different media to be "adjusted" for any desired reference medium will suggest themselves from the present disclosure as by experiment or by computation.

A float "adjusted" to a reference medium in the manner above described will be very sensitive to rise or sink in the medium with slight changes in its weight and will, therefore, be impractical for purposes of doing work such as actuating a valve in a segregator as described in my copending reissue application, Serial No. 414,759 filed December 17, 1929. It is, therefore, an essential feature of my invention to adjust the float device when intended to do work so that its weight is slightly less than the weight of the reference medium displaced by its entire volume but greater than the weight of a similar volume of any other medium with which the reference medium associates. When a float device is adjusted in this manner and placed in the medium to which it is adjusted, it possesses an undisplaced volume in an amount sufficient only to do a calculated amount of work, without affecting its "adjustment"; that is to say the undisplaced volume will be large enough to have a fluid buoyant force which is of sufficient intensity to oppose a fixed force but not of such size as to displace its weight in any other medium from which the reference medium is intended to be segregated and the amount of work that can be done will depend of course upon the size of the adjusted float device.

I have discovered a novel method in the process of manufacturing the float device for effecting the adjustment of the float device when required to do a fixed amount of work and for obtaining a reference mark approximately to which the float must be immersed in any desired liquid to be "adjusted" to that liquid. For a greater or less amount of work required to be done without effecting its "adjustment", I propose to increase or decrease the undisplaced volume directly proportional to an increase or decrease respectively in the volume of the float device. This I accomplish by computation. The weight of air displaceable by the undisplaced portion is comparatively negligible and is, therefore, not taken into consideration when adjusting the float device to do work as above described.

Preferably, the undisplaced volume for any size float device may be obtained by forming on the upper end of a hollow cylinder a spherical segment whose base radius is the radius of the cylinder and whose radius of curvature may be either calculated or found by experiment.

Accordingly, my invention contemplates a novel design of float device as illustrated in the drawing that is in the form of a hollow symmetrical container 2 having a cylindrical wall 4 and similar spherical end portions 6 and 8. This container is constructed in half sectional units from any suitable material, preferably from sheets of copper in view of its rust resisting quality.

These sectional units are identical in construction except for the two openings 10 made in the spherical end portion of one of them to receive the plugs 12. By removing the plugs, the float device can be "adjusted" in a manner hereinafter described to any desired reference medium. After obtaining the proper dimensions, each unit is spun from a sheet of copper to form a cylinder provided with a spherical end portion and their open ends are welded together to form a hollow symmetrical container. By constructing the undisplaced volume in the form of a spherical segment, a visual indication X is established due to its set-off relation with respect to the spherical wall for indicating the point approximately to which the float device must be immersed when being "adjusted" to do work. If, as shown in Fig. 10, the container is intended to cooperate with a needle valve 14, openings are formed in the end portions for fixedly receiving a tube 16 that is slidably mounted on a needle valve guide 18. These openings are in alignment and concentric with the vertical axis of the container.

The operation of adjusting the float device to any desired medium is as follows: The plugs are removed from the float device which is placed in the liquid to which the float is desired to be "adjusted" and a ballast, preferably liquid when used in connection with a segregator, is poured into the chamber of the float device. When said float device, including the valve and other parts intended to be carried thereby, is immersed within the reference medium to approximately the upper junction between the cylinder wall and spherical portions, it is then "adjusted" to the reference medium and capable of doing a fixed amount of work. When desired to adjust the float device to a different reference medium the ballast contained in the float device is emptied and the operation above described is repeated.

While I have shown my device adaptable to a fluid segregator and as an instrument, I do not wish to be so limited since the inventive features of my invention may be adapted to various uses.

I claim:

1. A float adjustable to different mean densities corresponding to liquids of different densities, said float comprising a container having an air chamber to receive an air displacing substance for weighting said float, and means cooperating with said chamber and forming a part of said float for establishing a desired relation between the weight of the air displacing substance and the volume of the float to obtain a float having a predetermined weight per unit volume such that said float will assume substantially the same buoyant position in any of the liquids to which it is adjustable, said float having a mean density such that it will displace a weight of said liquid to which it is adjusted that is less than the weight of the said liquid displaceable by the entire volume of said float but greater than a similar volume of any medium having a lesser density than the density of said liquid.

2. Means for operating a valve including a float device adjustable to different mean densities corresponding to liquids of different densities, said float device comprising a container having an air chamber adapted to receive a liquid for weighting said float device, and means cooperating with said chamber and forming a part of said float for establishing a desired relation between the weight of the liquid and the volume of the float to obtain a float having a predetermined weight per unit volume such that said float will assume substantially the same buoyant position in any of the liquids to which it is adjustable, said float having a mean density such that it will displace a weight of said liquid to which it is adjusted that is less than the weight of the liquid displaceable by the entire volume of said float but greater than a similar volume of any medium having a lesser density than the density of the reference medium and being of sufficient volume to be capable of doing work required to actuate said valve.

DAVID SAMIRAN.